US008828570B2

(12) United States Patent
Banerjee et al.

(10) Patent No.: US 8,828,570 B2
(45) Date of Patent: Sep. 9, 2014

(54) BATTERY TEMPERATURE SENSOR

(75) Inventors: Neel Banerjee, Corvallis, OR (US); Andrew L. Van Brocklin, Corvallis, OR (US); Randy Hoffman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 326 days.

(21) Appl. No.: 13/172,158

(22) Filed: Jun. 29, 2011

(65) Prior Publication Data

US 2013/0004811 A1 Jan. 3, 2013

(51) Int. Cl.
| | |
|---|---|
| *H01M 10/50* | (2006.01) |
| *H01M 6/50* | (2006.01) |
| *H01M 10/48* | (2006.01) |
| *H01M 2/34* | (2006.01) |
| *G01K 13/00* | (2006.01) |
| *G01K 7/16* | (2006.01) |
| *H01M 10/44* | (2006.01) |
| *G05D 23/24* | (2006.01) |

(52) U.S. Cl.
CPC .......... *H01M 10/486* (2013.01); *H01M 6/5044* (2013.01); *Y02E 60/12* (2013.01); *H01M 2200/10* (2013.01); *H01M 2/348* (2013.01); *H01M 10/5004* (2013.01); *H01M 10/50* (2013.01); *H01M 10/502* (2013.01); *G05D 23/241* (2013.01); *G01K 13/00* (2013.01); *G01K 7/16* (2013.01); *H01M 10/443* (2013.01); *H01M 10/5026* (2013.01)
USPC .................... 429/62; 429/61; 429/90; 429/92; 429/94; 429/121; 429/122; 429/124; 429/138; 429/141; 429/144

(58) Field of Classification Search
CPC ....... G01K 13/00; G01K 7/16; H01M 10/486; H01M 10/5004; H01M 6/5044; H01M 10/50; H01M 10/443; H01M 10/502; H01M 2010/4278; H01M 10/5026; H01M 2200/10; H01M 2/348; Y02E 60/12; G05D 23/241
USPC ........... 429/61–32, 90, 92, 94, 121–122, 124, 429/138, 141, 144, 62
See application file for complete search history.

(56) References Cited

U.S. PATENT DOCUMENTS

| | | | |
|---|---|---|---|
| 6,893,753 B2 | 5/2005 | Iwaizono et al. | |
| 7,068,013 B2 | 6/2006 | Patino et al. | |

(Continued)

FOREIGN PATENT DOCUMENTS

| | | | | |
|---|---|---|---|---|
| JP | 2002-313431 A | * 10/2002 | ............ | H01M 10/40 |
| JP | 2002-313431 A | * 10/2002 | ............ | H01M 10/40 |
| WO | WO9931752 | 6/1999 | | |

OTHER PUBLICATIONS

Businesswire, "Freescale Introduces Intelligent Sensor for Car Battery Monitoring", Freescale SemiConductor, Feb. 28, 2011, pp. 1-3.
Printed Electronics World, "PVI: Towards a flexible e-book reader", Dec. 15, 2008, Taiwan, pp. 1-4.

(Continued)

*Primary Examiner* — Patrick Ryan
*Assistant Examiner* — Ben Lewis

(57) ABSTRACT

A battery temperature sensor may include a substrate and a thin film resistive temperature device (RTD). The substrate can be layered on a battery cell element. The battery cell element can be an anode, a cathode, and a separator between the anode and cathode used in a battery cell. The thin film resistive temperature device (RTD) on the flexible substrate can change resistance with a change in temperature. A battery cell housing can enclose the thin film RTD.

19 Claims, 17 Drawing Sheets

(56) References Cited

U.S. PATENT DOCUMENTS

| | | | |
|---|---|---|---|
| 7,155,075 B2 | 12/2006 | Rajendran et al. | |
| 2002/0075127 A1* | 6/2002 | Inoue et al. | 338/22 R |
| 2005/0254552 A1* | 11/2005 | Bruce et al. | 374/208 |
| 2009/0085714 A1* | 4/2009 | Yamashita | 338/22 R |
| 2009/0296781 A1 | 12/2009 | Weber et al. | |
| 2010/0104937 A1* | 4/2010 | Unterdorfer et al. | 429/120 |

OTHER PUBLICATIONS

Ed Holland, "Roll to roll imprint lithography for flexible electronics and structural templates", Mobile and Immersive Experience Lab, HP Laboratories, Palo Alto, California, 2010.

Carl Taussig, et al., "Roll-to-Roll Manufacturing of Flexible Displays", Hewlett-Packard Company, Palo Alto, CA and Phicot Inc, Ames, IA.

* cited by examiner

BATTERY TEMPERATURE SENSOR

BACKGROUND

An electrical battery can include one or more electrochemical cells that convert stored chemical energy into electrical energy. Heat and changes in temperature can affect the chemical processes of the battery, which can degrade the battery and generate safety issues in using and storing batteries. With the growing number of battery applications, maintaining multi-cell battery packs safely can be a concern.

Thermal management of batteries can be used with smaller batteries in mobile devices and larger battery packs in electric vehicles, off grid energy storage, and backup applications. Temperature sensors can be used in battery thermal management systems to determine the temperature of monitored batteries. Depending on the application, a single temperature sensor or multiple sensors can be built into a battery pack. Mobile applications can use smaller quantities of sensors while electric vehicles can employ many sensors.

DETAILED DESCRIPTION

Figure 1:
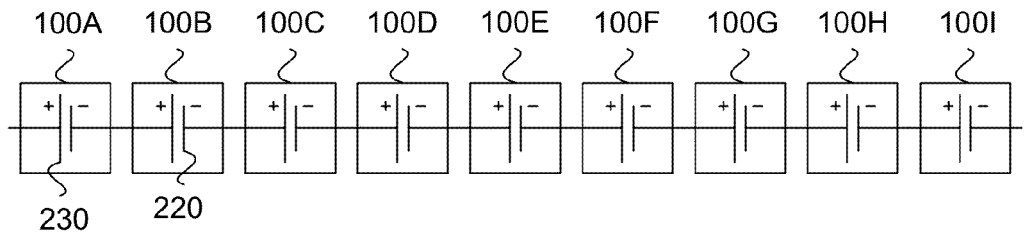
FIG. 1 is an illustrative diagram showing a horizontal battery cell configuration of one battery cell in parallel and nine battery cells in series in accordance with an example.

Alterations and further modifications of the illustrated features, and additional applications of the principles of the examples, which would occur to one skilled in the relevant art and having possession of this disclosure, are to be considered within the scope of the disclosure. The same reference numerals in different drawings represent the same element.

A battery pack can include multiple battery cells connected in series and/or parallel. Each of the battery cells can generate heat via the electrochemical process used to produce electricity or recharge the batteries, and heat can also be introduced by the environment in which the battery cells are being used. Thermal gradients across a battery pack can cause uneven degradation of certain parts of each of the battery cells.

A thermal gradient (or temperature gradient) can be a physical quantity that describes in which direction and at what rate the temperature changes the most rapidly around a particular location, such as a battery cell. The thermal gradient can be a dimensional quantity expressed in units of degrees (on a particular temperature scale) per unit length, such as kelvin per meter (K/m).

Although a battery pack design can alleviate some problems associated with the structural location of cells, some thermal gradients can occur in manner that are unexpected by a battery pack designer, such as an environmental condition. For example, the radiation from the sun can increase the heat on one area of a battery pack while another area in the shade may have a lower temperature.

Figure 2:
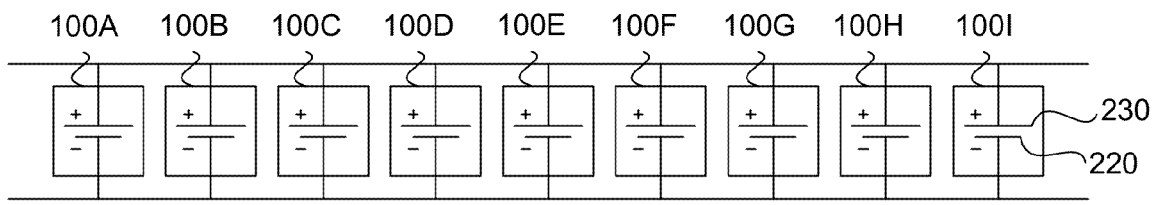
FIG. 2 is an illustrative diagram showing a horizontal battery cell configuration of nine battery cells in parallel and one battery cell in series in accordance with an example.
Figure 3:
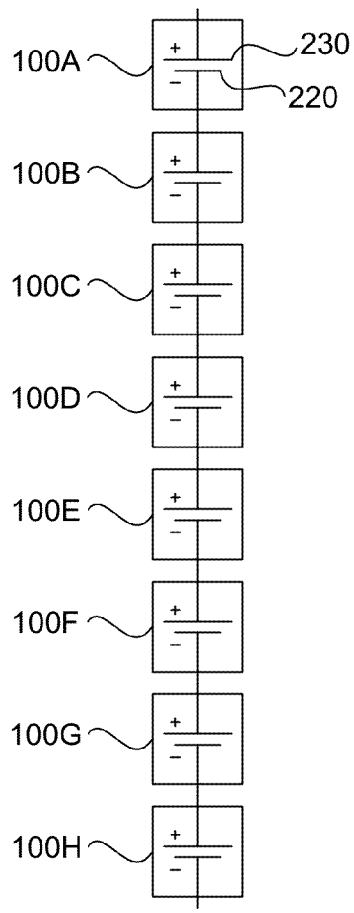
FIG. 3 is an illustrative diagram showing a vertical battery cell configuration of one battery cell in parallel and eight battery cells in series in accordance with an example.

FIG. 1 illustrates an example of a horizontal battery cell configuration for a battery unit (battery pack) that contains one battery cell in parallel and nine batteries cells in series. Each battery cell 100A-I can include an anode 230 and a cathode 220. For example, the battery cells can be lithium ion cells. FIG. 2 illustrates an example of a battery unit that contains nine battery cells in parallel in a horizontal battery cell configuration. FIG. 3 illustrates an example of a battery unit that contains nine battery cells in series in a vertical battery cell configuration. The two cases of cell organization shown in FIGS. 1 and 3 can illustrate how certain designs can alleviate thermal problems, but can introduce other issues under different conditions. For example, FIG. 1 shows a battery unit design that has a minimal vertical thermal gradient in a battery unit, but a horizontal thermal gradient may be large. In contrast, FIG. 3 shows the opposite case where a battery unit design has a minimal horizontal thermal gradient, but a vertical thermal gradient may be large.

A thermal gradient in a battery unit can be monitored using a temperature sensor. In the past, temperature sensors for a battery unit have been external to the individual battery cells used to power the battery unit. For example, a temperature sensor may be coupled to the outside of a battery cell housing. However, the external temperature sensor may not be able to detect a thermal excursion occurring due to an internal battery cell condition, such as a cell failure that leads to an internal short when the condition is occurring or within a short time after the condition. An internal short in a separator between an anode and cathode can generate a significant amount of localized heat that may not be detected by a temperature sensor on a battery cell housing within a reasonable time and/or with a reasonable degree of sensitivity.

Figure 4:
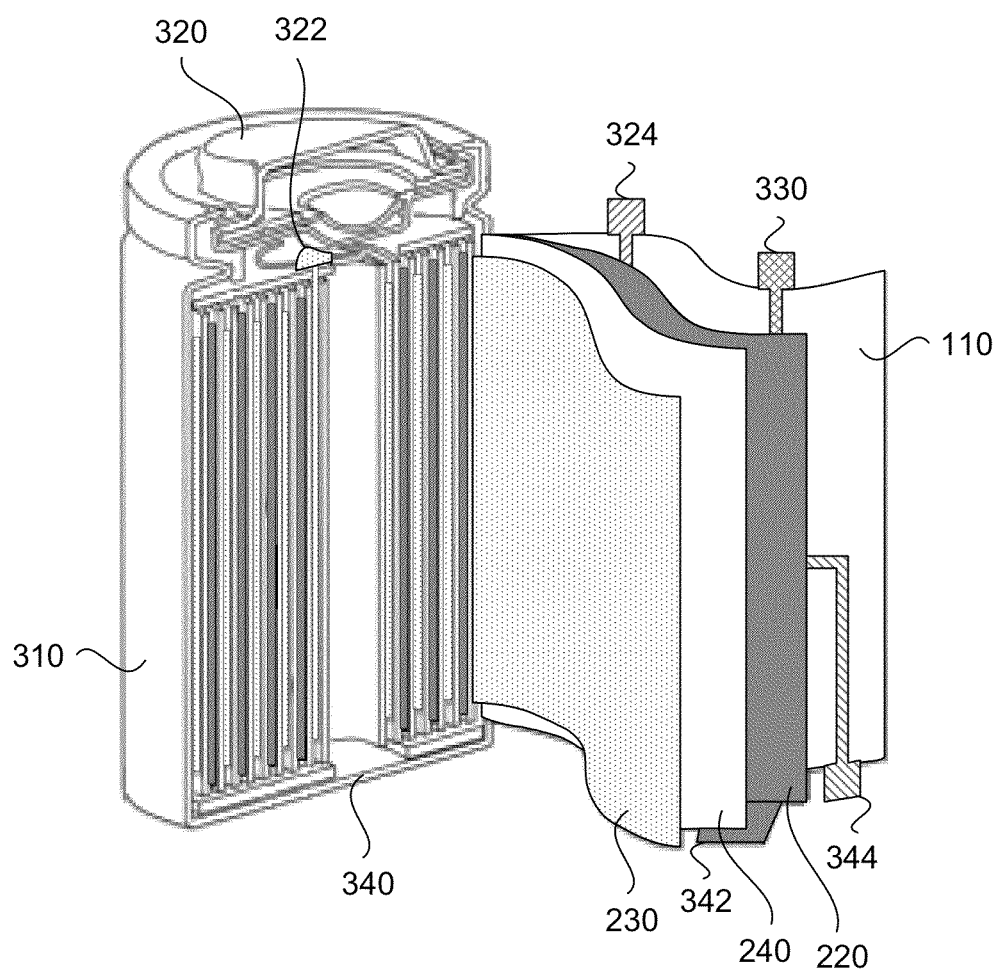
FIG. 4 is an illustrative diagram showing a cylindrical cell with an integrated battery temperature sensor in accordance with an example.

A battery sensor internal to the battery cell housing can sense temperature changes earlier and more accurately than an external battery sensor. As illustrated in FIG. 4, a battery temperature sensor can be fabricated on a flexible substrate 110, which can be layered on a battery cell element. Thus, one or more battery temperature sensors can be integrated within each battery cell. The battery temperature sensor may detect an internal temperature within a battery cell housing 310 and/or a temperature of an internal battery cell element. With the ability to measure internal cell temperature at various locations within the battery cell, the detected change in temperature can be transmitted to a control unit that can minimize the gradient of temperature over the pack. The battery temperature sensor can be powered by the battery cell or an external power source.

A battery cell can be a rechargeable or a onetime use battery cell. Typical battery cell elements include an anode 220, a cathode 230, and a separator 240 between the anode and cathode. An anode can be a negative electrode (an electrical conductor) through which electric current flows into a polarized electrical device. The cathode can be a positive electrode (an electrical conductor) through which electric current flows out of a polarized electrical device. An electrolyte surrounding the anode and cathode can be used to facilitate ionic transportation between the anode and cathode. The electrolyte can be a liquid or a gel. A micro semi-porous membrane separator between the anode and cathode may be used to allow ionic transportation through the separator while minimizing the mixing of the electrolyte surrounding the anode and the cathode.

The anode 220 can include a negative tab 342 that can protrude through an electrolyte chamber and the negative tab can be coupled to a negative battery terminal 340 on the battery cell housing 310. The cathode 230 can include a positive tab 322 that can protrude through an electrolyte chamber and the positive tab can be coupled to a positive battery terminal 320 on the battery cell housing. A flexible substrate 110 can include battery temperature sensor tabs 324, 330, and 344 which can couple the battery temperature sensor to the terminals on the battery cell housing.

Figure 5:
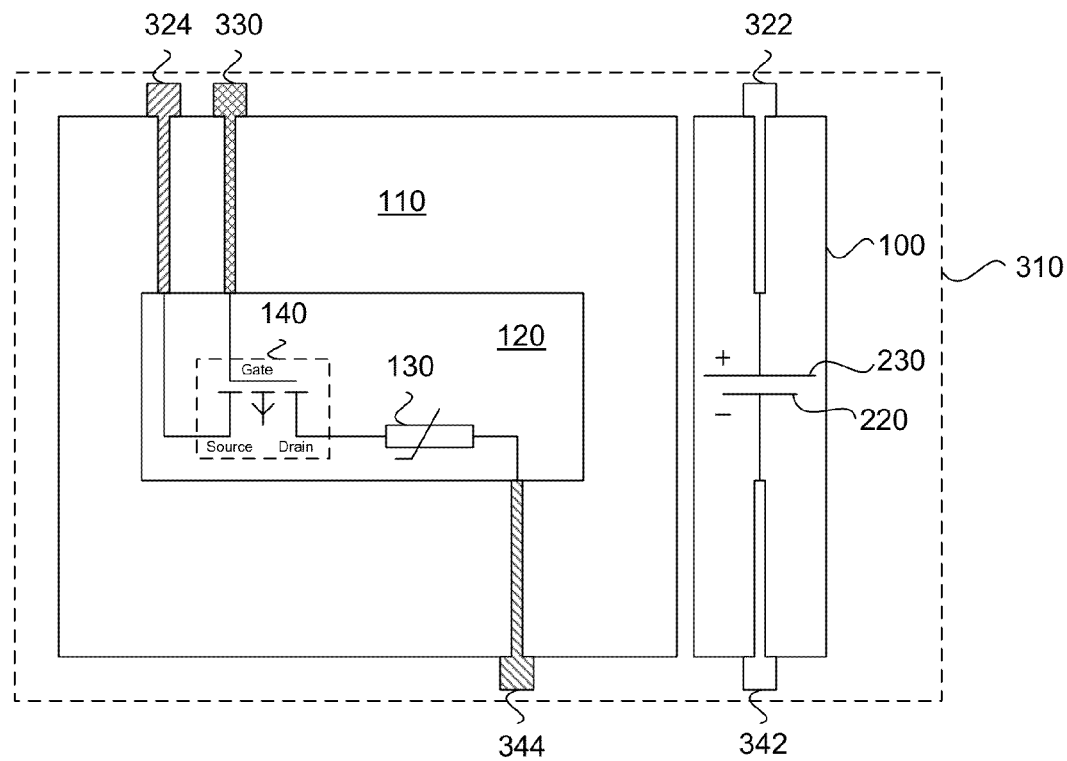
FIG. 5 is an illustrative diagram showing a battery temperature sensor with a thin film thermistor and thin film transistor (TFT) on a flexible substrate in accordance with an example.

As illustrated in FIG. 5, the flexible substrate 110 can include a thin film resistive temperature device (RTD) 120 that can change resistance with a change in temperature. The flexible substrate may be formed of any suitable flexible material, such as, for example, a stainless steel foil, a polyimide (PI), a polyethylene naphthalate (PEN), a polyethylene terephthalate (PET), or combination of these substrate materials. The thin film RTD on the flexible substrate can be layered with a battery cell element of the battery cell 100. A battery cell housing 310 can enclose the thin film RTD. In an example, the thin film RTD can include a thin film thermistor 130 coupled to a thin film transistor (TFT) 140. The thin film thermistor can be fabricated from a thermo-resistive material whose resistance varies predictably with temperature, such as platinum (Pt), nickel (Ni), copper (Cu), or alloys of these thermo-resistive materials. The thermo-resistive material can change resistivity (resistance) with a change in temperature. The thin film thermistor can be patterned onto the flexible substrate. The thin film thermistor pattern can be based historical on battery failure mechanisms, historical battery failure data, and/or a defect density. The pattern can provide continuous coverage, uniform coverage, or specific coverage of the battery cell element.

The TFT 140 can be used to sense or control a measurement of the resistance on the thin film thermistor. The TFT may be referred to as a control transistor. The TFT can be an enhancement (as in FIG. 5) or depletion metal-oxide-semiconductor (MOS) transistor. A MOS transistor can include a P-type metal-oxide-semiconductor (PMOS) transistor (as in FIG. 5) or a N-type metal-oxide-semiconductor (NMOS) transistor. In the example shown in FIG. 5, the source of the TFT can be coupled to a positive sensor tab 324, which can be coupled to a positive sensor terminal on the battery cell housing 310. A first contact of the thin film thermistor 130 can be coupled to the negative sensor tab 344, which can be coupled to a negative sensor terminal on the battery cell housing. The positive sensor terminal and negative sensor terminal can be used by a control module to measure a voltage or a current. The drain of the TFT can be coupled to a second contact of the thin film thermistor. The gate of the TFT can be coupled to a sensor control tab 330, which can be coupled to a sensor control connection (terminal) on the battery cell housing. The gate can control a current flow through the thin film thermistor. The positive sensor tab, the negative sensor tab, and the sensor control tab can be on an edge of the flexible substrate and may be coupled to a control unit for sensing a temperature on the battery temperature sensor. The TFT can be fabricated using a hydrogenated amorphous Si (a-Si:H); an oxide semiconductor, such as a indium-gallium-zinc (In—Ga—Zn) oxide ("IGZO"), a zinc (Zn) oxide, or a zinc-tin (Zn—Sn) oxide ("ZTO"), an oxide semiconductor; or a combination of these TFT materials, and may be an NMOS or a PMOS type device depending on the semiconductor material selected.

The integration of the thin film thermistor, TFT, other thin-film devices, and/or other electrical components on the flexible substrate can be fabricated using suitable processes such as an Electronics on Plastic by Laser Release (EPLaR) process or a roll-to-roll compatible Self-Aligned Imprint Lithography (SAIL) process. The EPLaR process can use a glass-fab TFT processing (as used to manufacture active-matrix liquid crystal display [AMLCD] TFT backplanes on glass substrates) to fabricate TFTs and other devices and/or circuitry on a flexible polyimide substrate bonded to a glass carrier. The polyimide substrate can be less than 10 μm in a thickness as suitable for a particular application. The thermistor, TFT, and/or thin-film devices can be fabricated on the polyimide substrate along with a flexible protective layer which can protect the thin-film devices. The polyimide substrate can be released from the rigid glass carrier using a laser release process, forming flexible thin film devices. The EPLaR process can be applied using active matrix liquid crystal display (AM-LCD) manufacturing equipment.

Alternatively, the Self-Aligned Imprint Lithography (SAIL) process allows for a single step pattern definition using multiple patterns in a monolithic pre-aligned mask and imprint lithography. The SAIL process encodes multiple patterns and alignments into thickness modulations of a 3-dimensional monolithic imprint masking structure. Pattern imprinting used in the SAIL process can include building a thin film device with a stack of layers on a substrate, coating the stack with a polymer etch resist, embossing/imprinting the polymer using the 3-dimensional imprint mask, and curing the polymer (the polymer can be cured with ultraviolet [UV] light) to replicate the imprint mask pattern. Processing can include recursively etching the exposed stack material, etching a portion of the polymer mask, and etching additional exposed stack material until the thin film device is formed.

A thermal management system can use the thin film RTD with a control unit in the following way. When a temperature measurement is to be made, the control unit can query the particular battery cell to be queried for its battery cell temperature. The control unit can apply a current and measure the voltage (or, alternately, apply a voltage and measure a current) to determine the temperature of the battery cell. Due to cost considerations or other considerations, some systems may not have multiple analog-to-digital converters (ADCs), thus the measurements may be time sliced. If additional ADCs are present, the total time for making temperature measurements may be reduced. After a measurement is taken the value can be stored in a random access memory (RAM) in the control unit. The control unit can include a processor and memory. When temperature measurements of a specified region have been completed, a control algorithm to minimize the gradient of the temperature in the battery pack can be applied. Generally, the control unit can have an initial condition where battery cells can be queried for temperature. But if a certain pattern is detected where a range of cells consistently has a temperature deviation, the boundary of the temperature variation can be monitored more frequently to determine if the region is growing or shrinking. The control unit can then actuate fans, cooling systems, heating systems, or use similar devices to minimize the temperature gradient.

Figure 6:
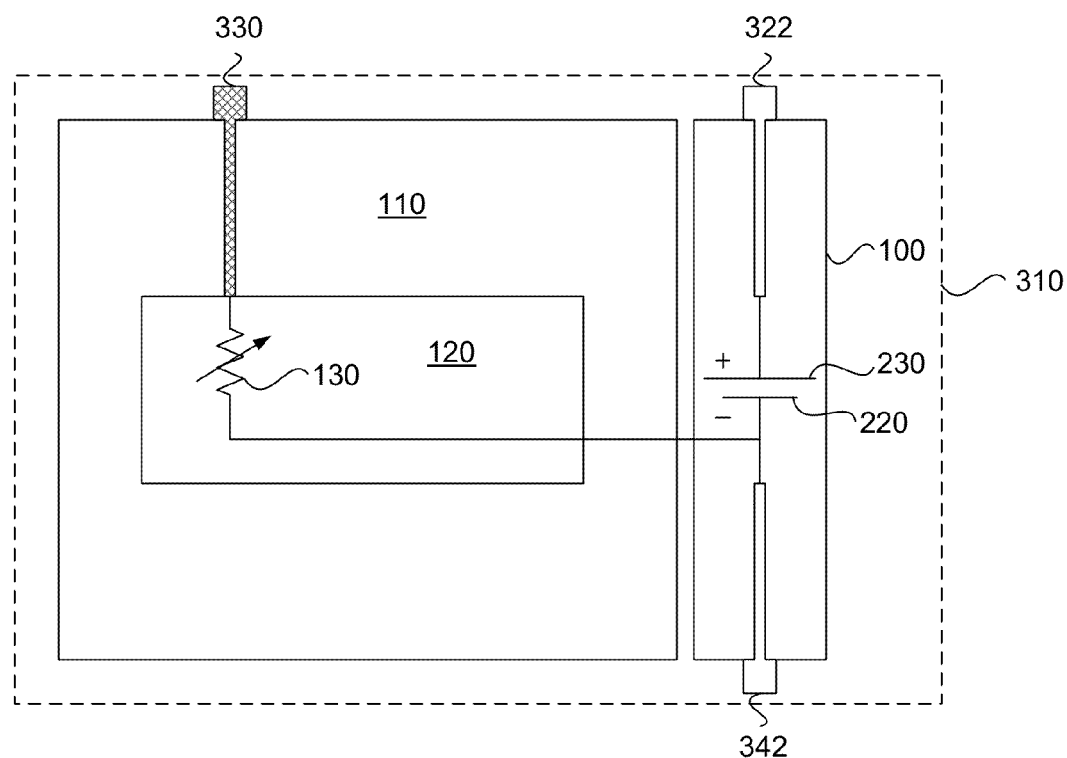
FIG. 6 is an illustrative diagram showing a battery temperature sensor with a thin film thermistor on a flexible substrate in accordance with an example.

As illustrated in FIG. 6, another example of the thin film RTD 120 can include a thin film thermistor 130 coupled to a battery cell tab (or terminal) and a sensor control tab 330, which can be coupled to a sensor control connection on the battery cell housing 310. In the example of FIG. 6, a first contact of the thin film thermistor can be coupled to a negative battery tab 342, which can be coupled to a negative terminal on the battery cell housing. In this example, the first contact of the thin film thermistor can be referred to as a negative sensor terminal A sensor control tab can couple a second contact of the thin film thermistor to a control module (or control unit), which is discussed in greater detail below.

Figure 7:
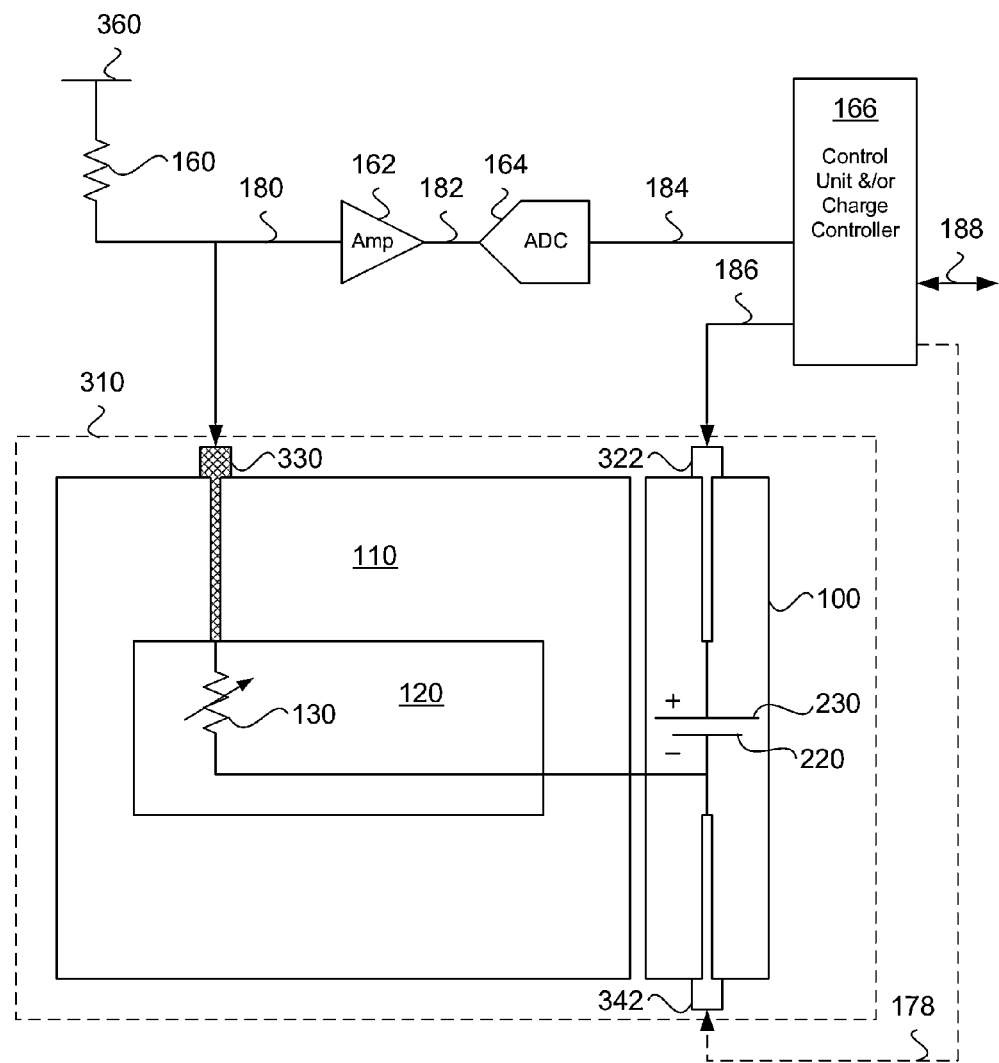
FIG. 7 is an illustrative diagram showing a battery temperature sensor with a thin film thermistor on a flexible substrate using a half-bridge configuration in accordance with an example.

In another example, the thin film RTD 120 of FIG. 6 can be coupled to a fixed resistor 160 and a control unit 166, as illustrated in FIG. 7. The sensor control tab 330 can be coupled to a first contact 180 of the fixed resistor via the sensor control connection on the battery cell housing 310. A second contact of the fixed resistor can be coupled to a reference voltage 360. The fixed resistor may have a relatively small fluctuation in resistance with a change in temperature as compared to the thin film thermistor. The fixed resistor and the internal thin film thermistor may form a half bridge (or voltage divider) where a voltage at the sensor control tab may predictably vary with a change in the thermistor temperature. The fixed resistor may be within the battery housing or external to the battery housing. The fixed resistor may be a discrete device, on an integrated circuit (IC), or a thin film device. The sensor control tab may be coupled to an amplifier input of an amplifier 162, which can buffer or amplify the signal (voltage) on the sensor control tab. An amplifier output 182 of the amplifier can be coupled to an analog-to-digital converter (ADC) input of an ADC 164, where the ADC can convert the analog signal to a digital signal. An ADC output 184 of the ADC can be coupled to the control unit that can determine a temperature for the battery cell and control a cooling device and/or a heating device to maintain a constant temperature of the battery cells in a battery unit. The control unit can include a charge controller and can provide a power and communication connection 188 to the device that is being powered by the battery cell (or battery unit). The control unit can be coupled 186 and 178 to a positive tab 322 (or positive terminal) and/or a negative tab 342 (or negative terminal) of the battery cell. The negative battery terminal may be coupled to a ground connection. The ground connection may be a direct current (DC) voltage contact with a voltage less than the reference voltage.

Figure 8:
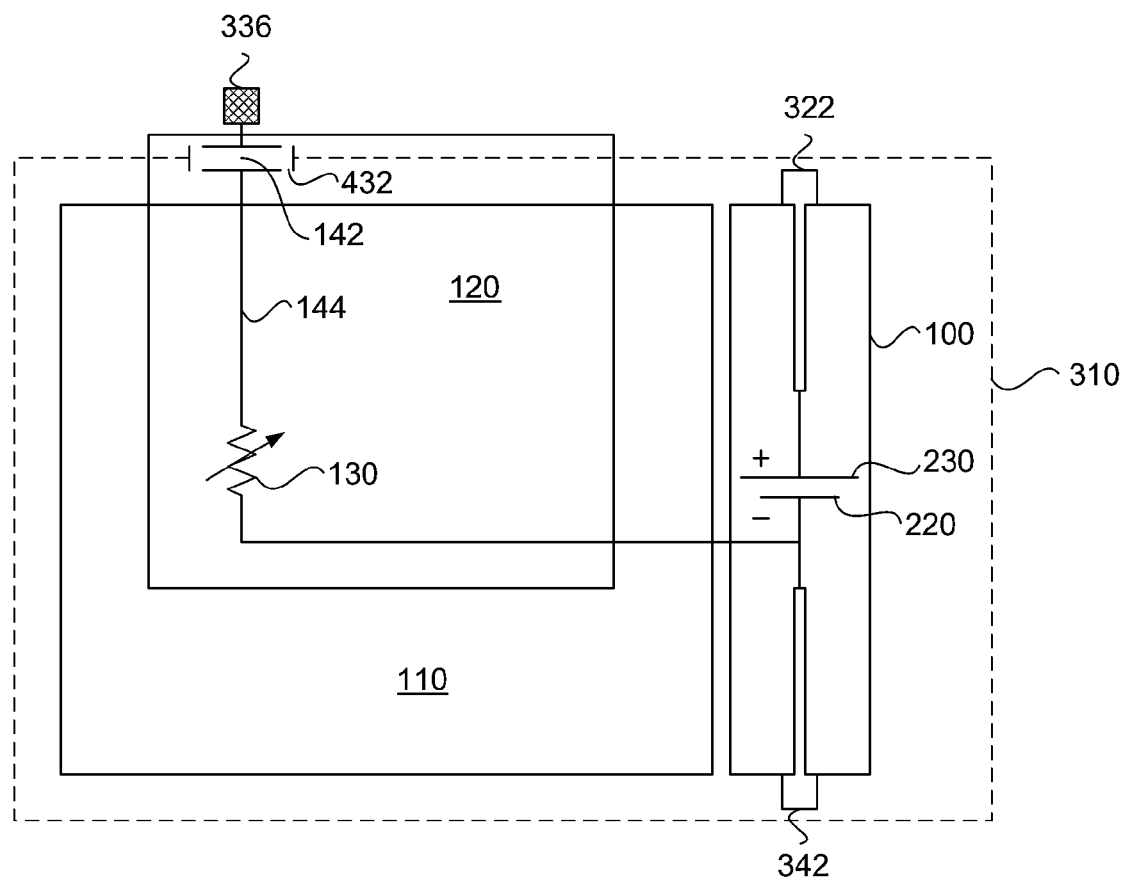
FIG. 8 is an illustrative diagram showing a battery temperature sensor with a thin film thermistor on a flexible substrate and a capacitor in accordance with an example.

In another example, the thin film RTD 120 can include a thin film thermistor 130 coupled to a capacitor 142, as illustrated in FIG. 8. The capacitor may be a discrete device or on an integrated circuit (IC). In the example of FIG. 8, a first contact of the thin film thermistor can be coupled to a negative battery tab 342, which can be coupled to a negative terminal on the battery cell housing. In this example, the first contact of the thin film thermistor can be referred to as a negative sensor terminal. A sensor control connection 336 can couple a first electrode of the capacitor to a control unit. A second contact of the thin film thermistor can be coupled to a second electrode of the capacitor.

The battery housing can provide electrical shielding for internal battery cell components, especially when materials used in the battery cell housing include a conductive metal. The battery cell housing may include a window 432 or connection to allow an alternating current (AC) signals to be transmitted from the capacitor, where an AC signal can be a high frequency signal or low frequency signal. Using the capacitor and the thin film thermistor, the change in temperature may vary an impedance of the thin film RTD. The capacitor may filter a low frequency or DC signal.

Figure 9:
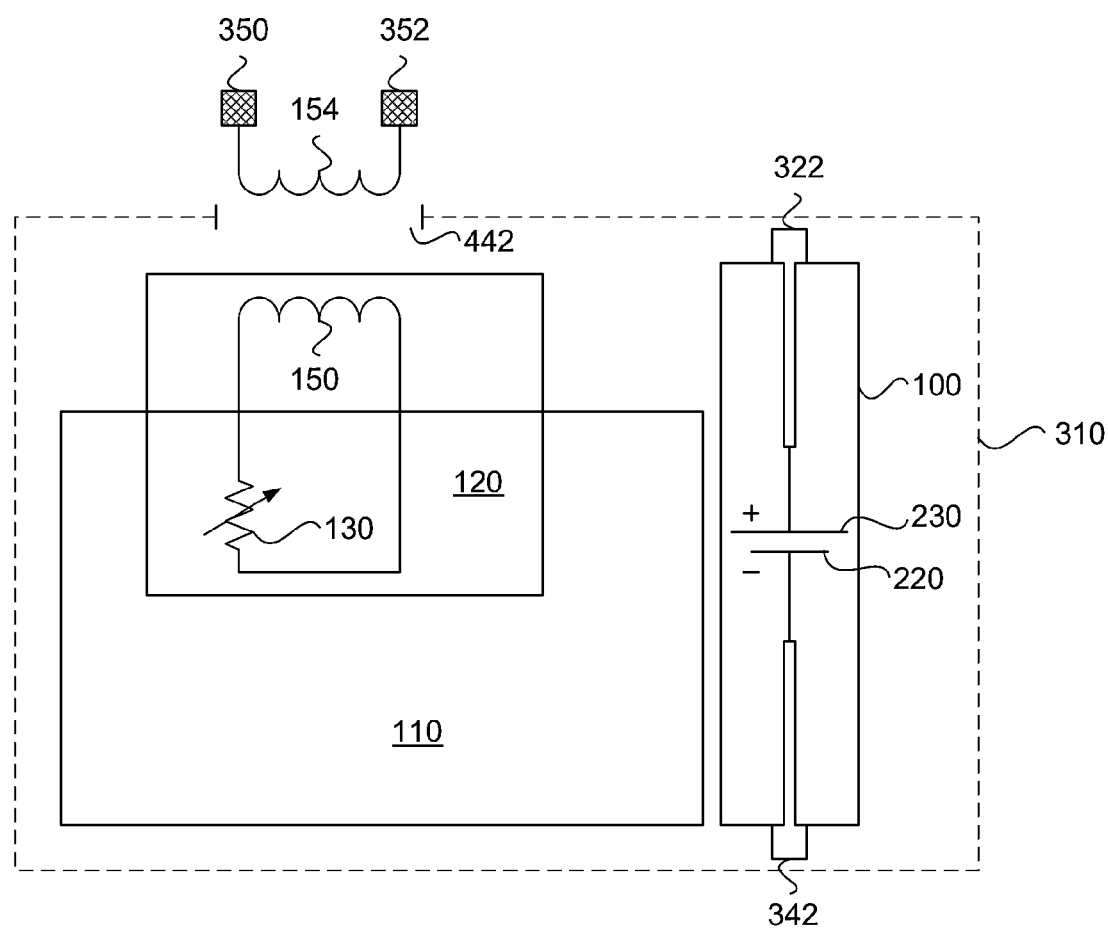
FIG. 9 is an illustrative diagram showing a battery temperature sensor with a thin film thermistor on a flexible substrate and an inductor in accordance with an example.

As illustrated in FIG. 9, the thin film RTD 120 can include a thin film thermistor 130 coupled to a battery inductor 150 where the battery inductor and thin film thermistor form a loop within a battery cell housing. The battery inductor may be a discrete device. The battery inductor and thin film thermistor can provide a conductance to an external inductor 154 coupled to a control unit. The external inductor can be external to the battery cell housing and have terminals 350 and 352 coupled to the control unit. The battery cell housing may include a window 442 or materials on a portion of the housing to facilitate the transmission of magnetic flux (or magnetic field or electromotive force [EMF]) generated by the external inductor and/or the battery inductor. The external inductor and/or the battery inductor may use mutual induction and operate as a transformer. The thin film thermistor coupled to a battery inductor may allow the sensing of a temperature without an additional battery terminal.

Figure 10:
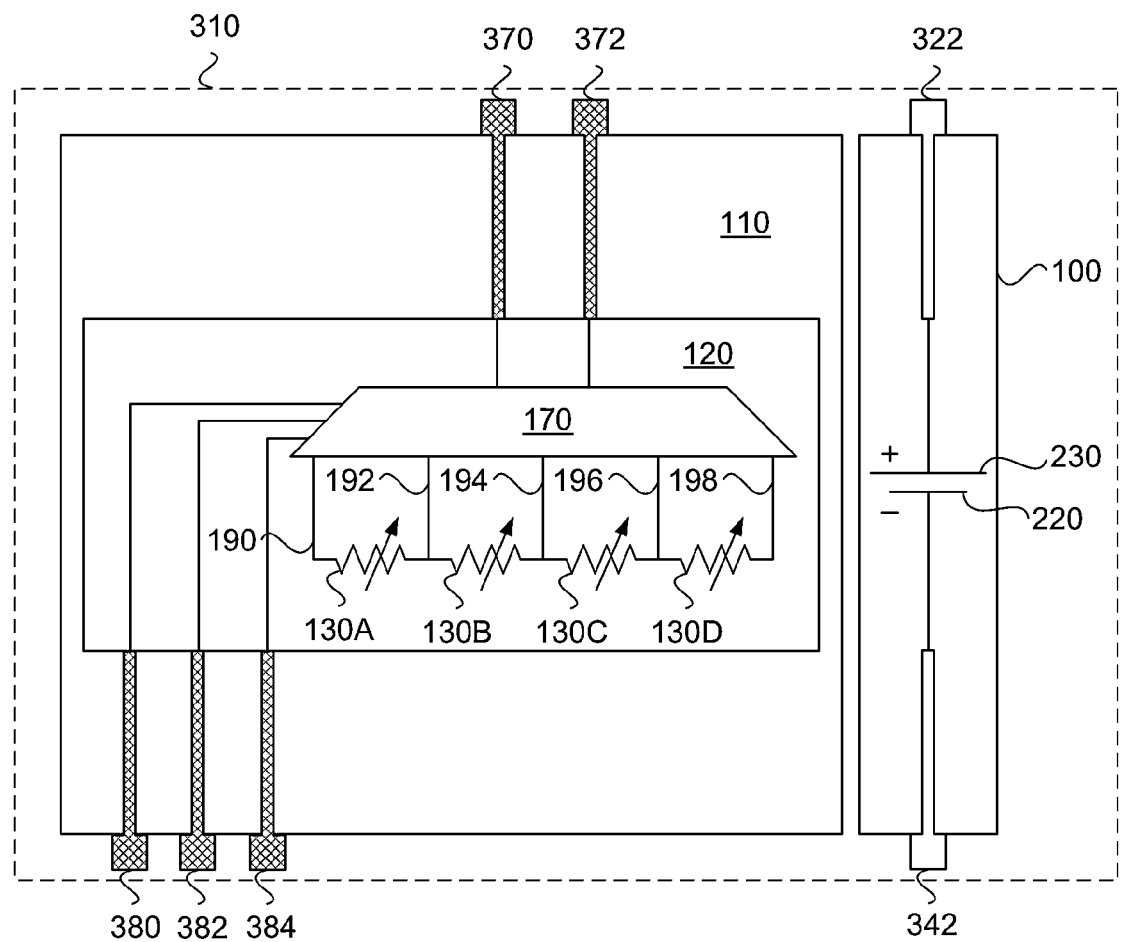
FIG. 10 is an illustrative diagram showing a plurality of battery temperature sensor with a plurality of thin film thermistors on a flexible substrate with a thermistor selector in accordance with an example.

As illustrated in FIG. 10, the thin film RTD 120 can include a plurality of thin film thermistors 130A-D coupled to a thermistor selector 170 with select lines. The thermistor selector may be a discrete device, on an integrated circuit (IC), or a thin film device. Each of the thermistors may be located in a different section of the battery cell. Each of the terminals 190, 192, 194, 196, and 198 of the thermistors may be coupled to inputs of the thermistor selector (or multiplexer). The output of the thermistor selector may be coupled to a first sensor tab 370 and a second sensor tab 372, where the first sensor tab and the second sensor tab are coupled to a first sensor terminal and a second sensor terminal on the battery cell housing 310. A temperature varying resistance may be measured across the first sensor terminal and the second sensor terminal based on the selector input signal on battery sensor selector input terminals coupled to battery sensor selector input tabs 380, 382, and 384, which are coupled to select lines of the thermistor selector. The thermistor selector can be used to select a specific thermistor or group (series) of thermistor, which can be used to identify a specific location within battery experiencing a temperature change when a general temperature change is detected. In the example of FIG. 10, the selector may couple the first sensor tab to thermistor terminals 190, 192, 194, and 196, and couple a second sensor tab to thermistor terminals 192, 194, 196, and 198 so various groups of thermistors can provide a resistance. The selector input signal for thermistor selector may be provided by a control unit which can determine the temperature based on the thermistor configuration selected.

For example, when no selector input signal is provided, the thermistor selector can provide a default coupling of the thermistor terminal 190 to the first sensor tab 370 and a coupling of the thermistor terminal 198 to the second sensor tab 372, which can provide a resistance of the group of thermistors 130A-D in series. Other selector input signals transmitted via the battery sensor selector input tabs 380, 382, and 384 may select individual thermistors, such as 130A, 130B, 130C, or 130D. Other selector input signals may select groups of thermistors, such as 130A and 130B; 130B and 130C; 130C and 130D; 130A, 130B, and 130C; or 130B, 130C, and 130D.

The previous examples illustrate the integration of one or more temperature sensors within each battery cell. The integrated temperature sensor can include at least one thin-film temperature sensor element and optionally one or more thin-film transistor (TFTs) or other circuit elements integrated upon a thin, flexible substrate. Multiple thermistors can be connected in parallel or series. Series connected thermistors can provide a greater temperature resolution to a specific location within the battery, as illustrated in FIG. 10. Parallel connected thermistors can provide redundant thermistors when thermistors fail.

In another example (not shown), the flexible substrate can include a thin film junction temperature sensor. The thin film junction temperature sensor may be combined with other electrical components similar to the thin film thermistor, previously described.

Figure 11:
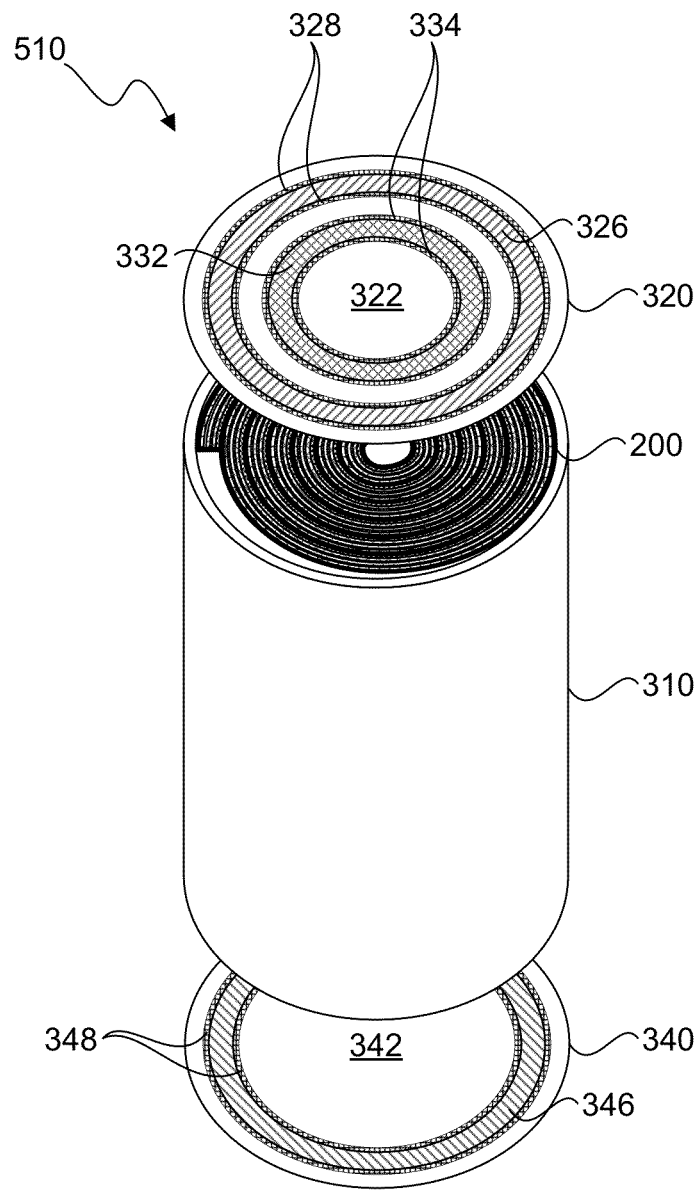
FIG. 11 is an illustrative diagram showing a battery cell housing with a positive sensor terminal, a negative sensor terminal, and a sensor control connection in accordance with an example.

Tabs on the flexible substrate may be coupled to terminals on the battery cell housing. The terminals may be placed anywhere on the battery cell housing. FIG. 11 illustrates a battery cell 510 with a positive sensor terminal 326, a negative sensor terminal 346, and a sensor control connection 332 which can be used with the flexible substrate illustrated in FIG. 5. The flexible substrate can be rolled and layered with battery cell elements in a cylindrical battery cell roll-to-roll configuration 200. In the example shown in FIG. 11, the positive sensor terminal and the sensor control connection may be located on the same end as the positive battery cell terminal 322 and may be electrically insulated 328 and 334 from the positive battery cell terminal. The negative sensor terminal may be located on the same end as the negative battery cell terminal 342 and may be electrically insulated 348 from the negative battery cell terminal.

Figure 12:
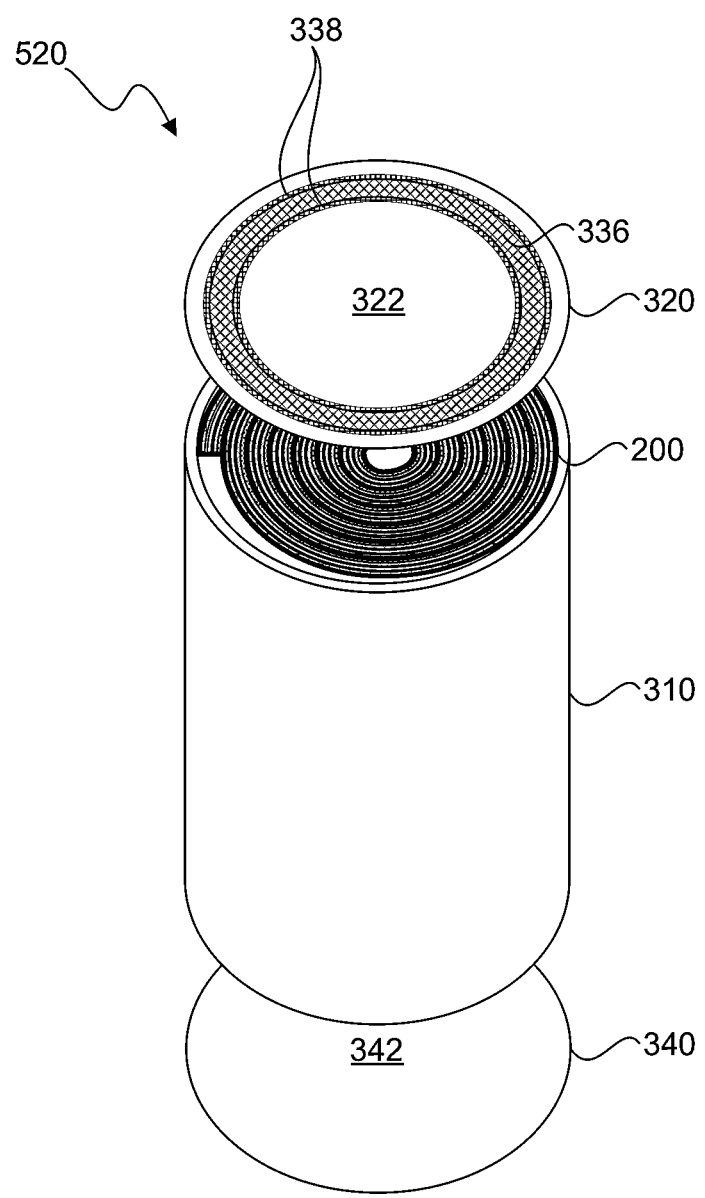
FIG. 12 is an illustrative diagram showing a battery cell housing with a sensor control connection in accordance with an example.

FIG. 12 illustrates a battery cell 520 with a sensor control connection 336 which can be used with the flexible substrates illustrated in FIGS. 6-8. The sensor control connection may be located on the same end as the positive battery cell terminal and may be electrically insulated 338 from the positive battery cell terminal. In other configurations, the battery cell housing (case) can have at least one external electrical connection in addition to the positive and negative battery cell terminals. The configuration of the terminals may depend on the battery temperature sensor and control circuitry connected to terminals as well as the connection to the device powered by the battery cell or the connection to a battery unit. A circular connection can make the mating connection to the device powered by the battery cell or the battery unit simpler. The cylindrical configuration battery cell with a circular connection can have multiple contact points and the rotation of the battery relative to the battery holder does not change the contact with the terminals.

The thin film resistive temperature device (RTD) on the flexible substrate coupled to terminals on the battery cell housing allows for an external control unit to determine the thermal gradient across a three dimensional (3D) volume and tailor the thermal management system to keep cells at a desirable thermal condition. The ability to maintain the entire battery pack at a constant thermal condition can increase safety, increase the life of the battery pack, and allow for more of the cells to be repurposed or reused, such as in battery cell recharging.

Figure 13:
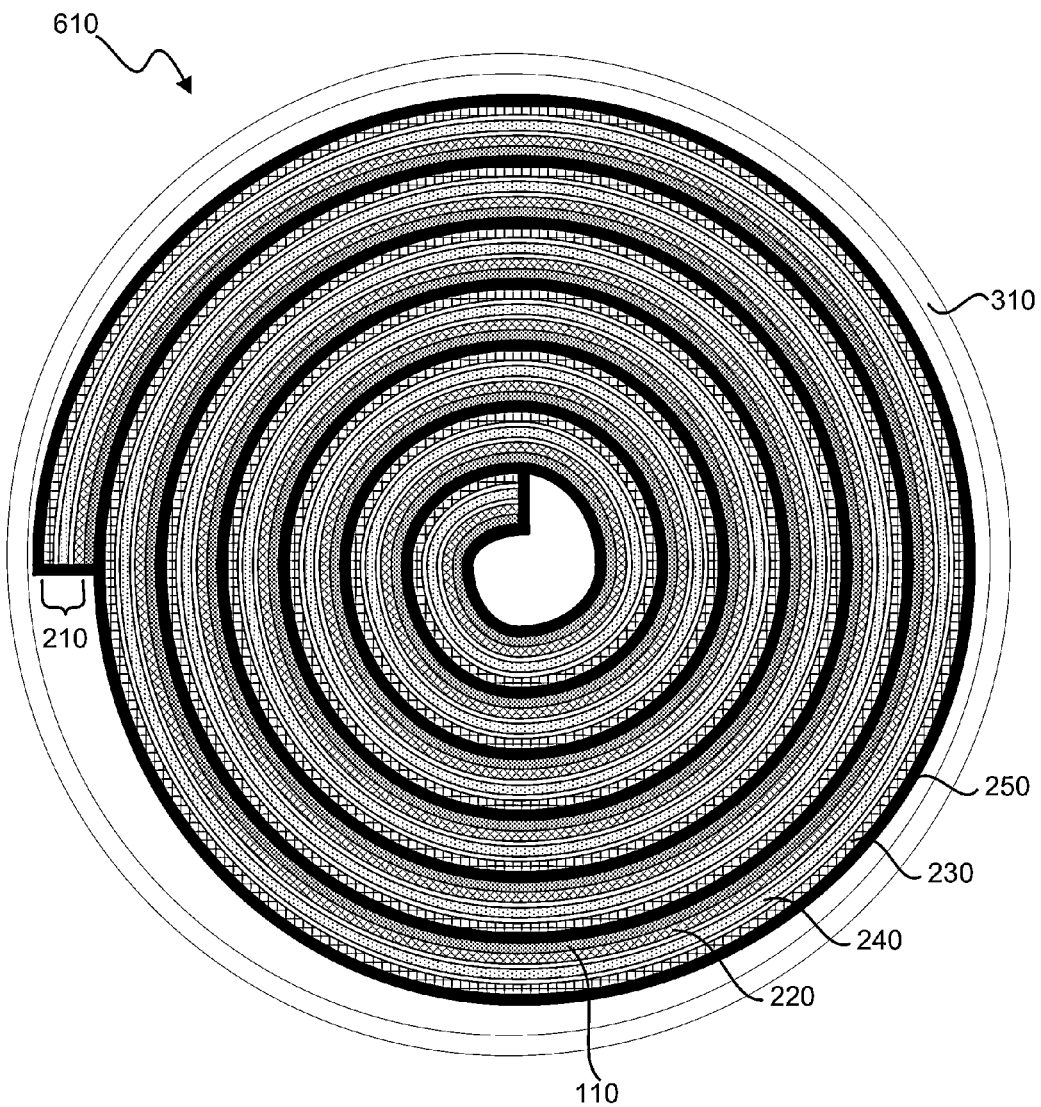
FIG. 13 is an illustrative diagram showing a cross-section of battery cell layers layered with a flexible substrate in a cylindrical cell roll-to-roll configuration in accordance with an example.

The battery temperature sensor can be integrated with battery cell elements, such as the anode, the cathode, and a porous separator separating the anode from the cathode, previously illustrated in FIG. 4. FIG. 13 illustrates an example of a temperature sensor (and other optional associated thin-film circuitry) with a thin, flexible, sheet-type form factor, which facilitates integration into a cylindrical battery cell configuration to create a monolithic cell with an internal temperature sensor. The battery cell 610 can include battery cell elements 210, such as the anode 220, the cathode 230, and the porous separator 240 separating the anode from the cathode. The battery cell elements can include a non-porous separator 250 which can provide a chamber for the electrolyte and/or provide a separation of one layer of battery cell elements from another layer of battery cell elements. The non-porous layer may impede or restrict the ionic transfer between the anode and cathode. FIG. 13 further illustrates a cylindrical cell comprising standard "jelly roll" (or roll-to-roll configuration) with the additional layer composed of a thin-film temperature sensor and optional control circuitry deposited on a flexible substrate 110 (illustrated by FIGS. 5-10). The flexible substrate layer can act as a sleeve that surrounds the jelly roll battery cell, and the jelly roll being housed within the battery cell housing 310. The flexible substrate layer can be laminated to the anode layer, the cathode layer, porous separator, or the non-porous separator. The materials used to fabricate the flexible substrate may impede or restrict the ionic transportation between anode and cathode, or the materials may facilitate ionic transportation. The flexible substrate layer can be laminated to a side of the anode layer opposite the porous layer (FIG. 13), laminated to a side of the cathode layer opposite the porous layer, or laminated to a side of the non-porous layer adjacent to the anode or cathode layer. The battery cell housing can enclose the anode, the cathode, the porous separator, and the thin film temperature sensor.

The flexible substrate 110 (sleeve) can have external electrical connections or tabs (illustrated by FIGS. 5-10) on the ends of the jelly roll, which can depend on the configuration of the thin film resistive temperature device (RTD) and other control circuitry. The tabs can be connected to terminals on the battery cell housing 310 (illustrated by FIGS. 11-12), which can be on the top and bottom of the battery cell.

Figure 14:
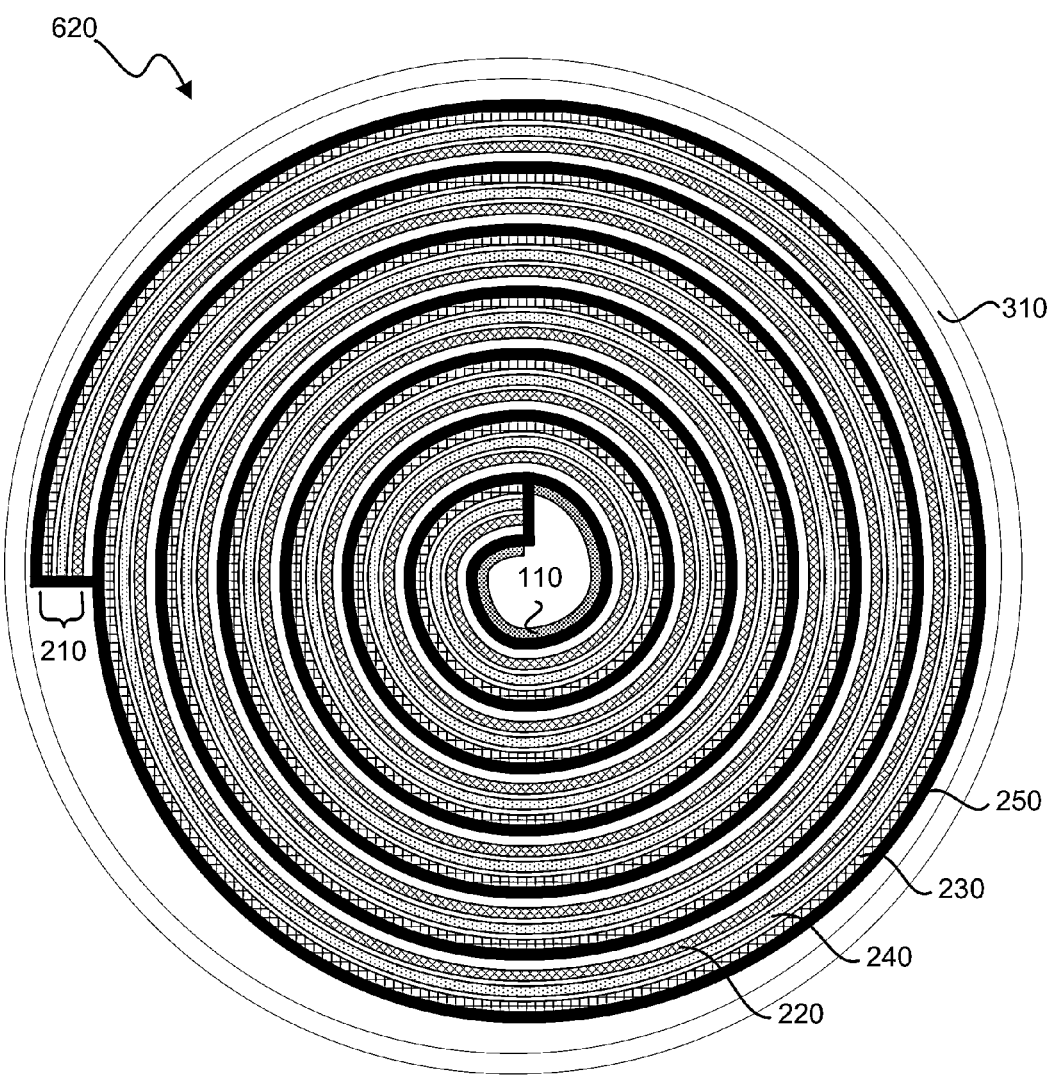
FIG. 14 is an illustrative diagram showing a cross-section of battery cell layers with a flexible substrate in the center of the battery cell in a cylindrical cell roll-to-roll configuration in accordance with an example.

In another roll-to-roll configuration example as illustrated in FIG. 14, the battery cell 620 can include a flexible substrate 110 in a center of the jelly roll. The center of the battery cell may have a higher temperature relative to other parts of the battery cell. The flexible substrate in the center of the jelly roll can be inserted after the jelly roll has been fabricated.

Figure 15:
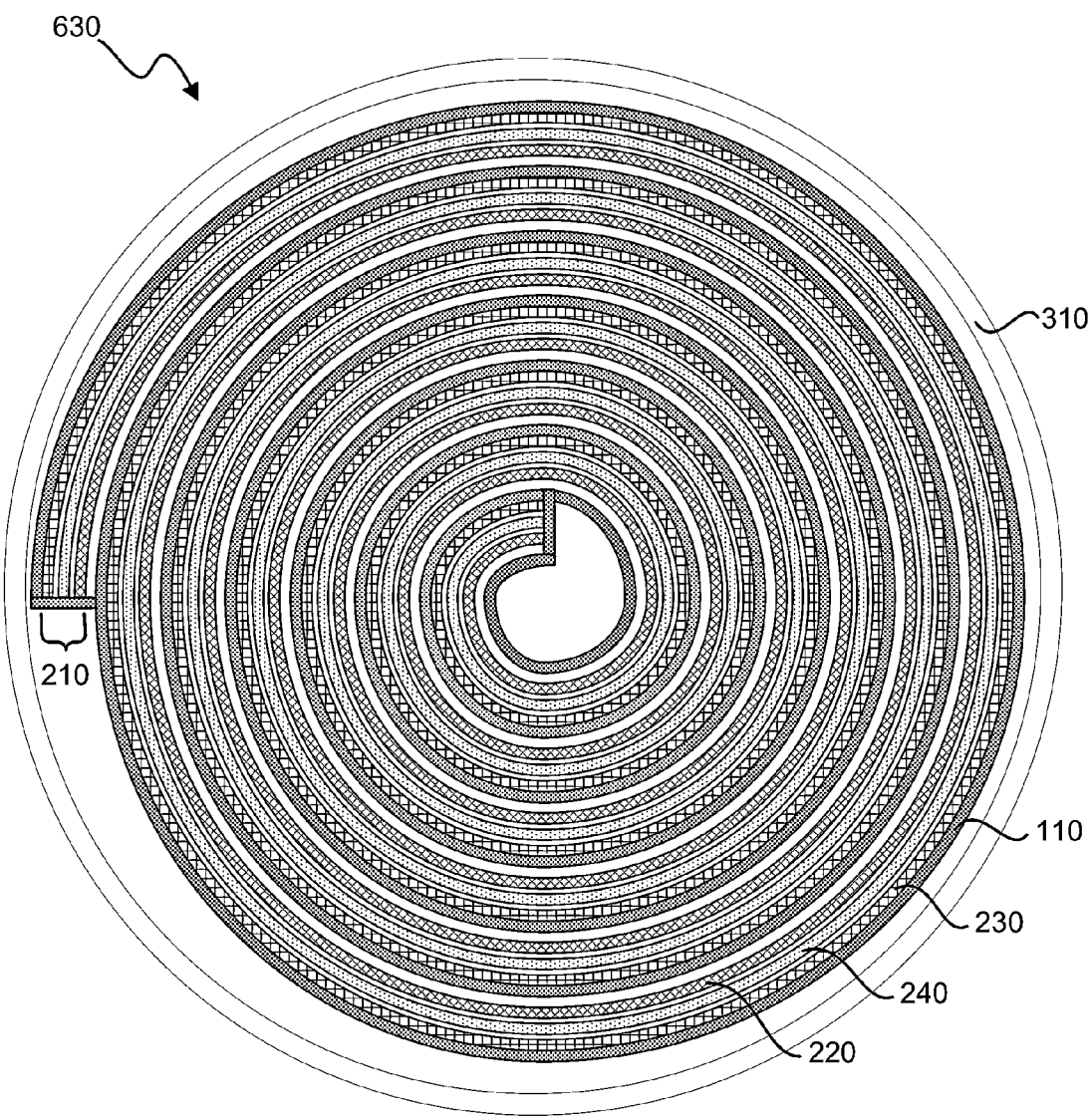
FIG. 15 is an illustrative diagram showing a cross-section of battery cell layers with a flexible substrate forming a nonporous separating layer in a cylindrical cell roll-to-roll configuration in accordance with an example.
Figure 16:
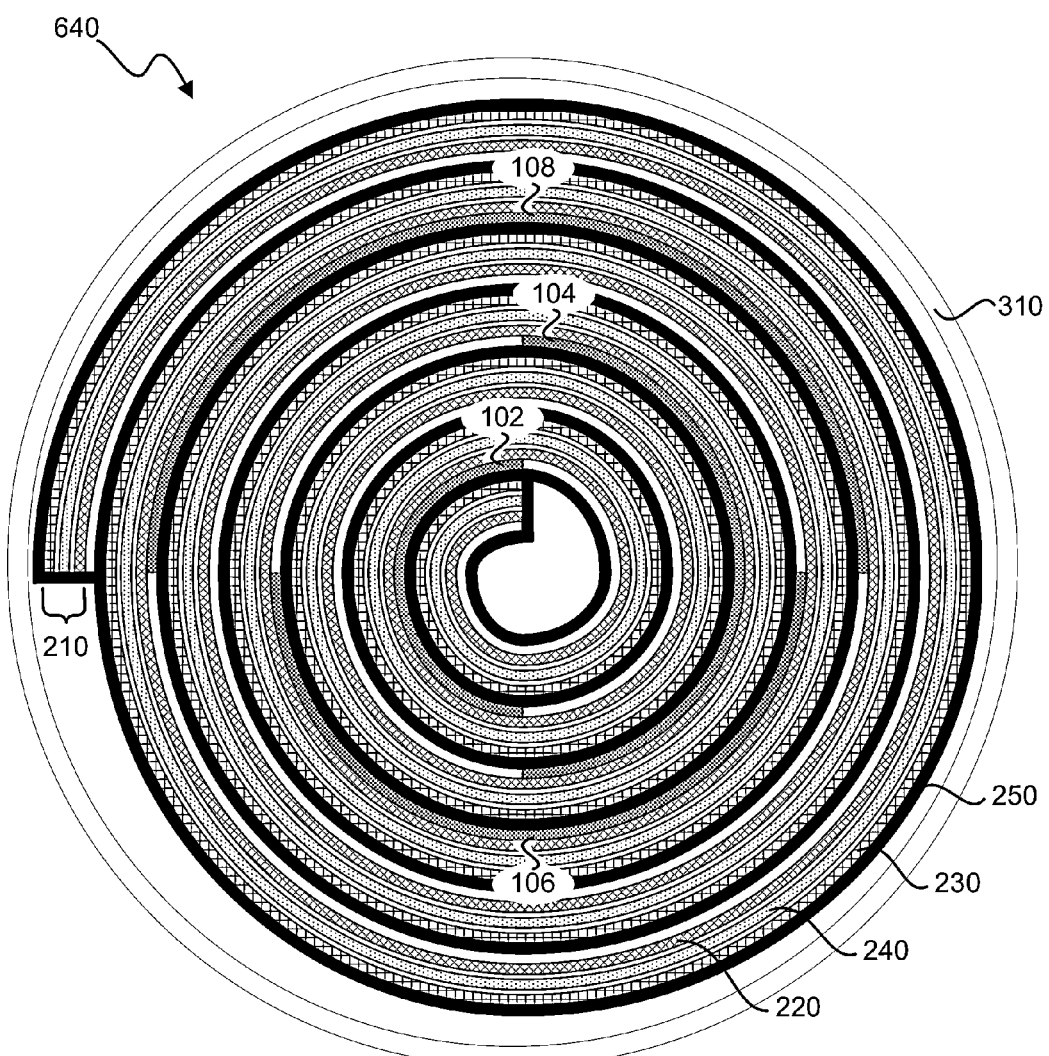
FIG. 16 is an illustrative diagram showing a cross-section of battery cell layers layered with a plurality of flexible substrate segments in a cylindrical cell roll-to-roll configuration in accordance with an example.

FIG. 15 illustrates an example where the flexible substrate 110 can provide a non-porous separator in a roll-to-roll configuration for a battery cell 630. FIG. 16 illustrates an example where the flexible substrate 102, 104, 106, and 108 can be laminated or layered to sections of a jelly roll in a roll-to-roll configuration for a battery cell 630. The flexible substrate can be layered into specific portions of a jelly roll known to have larger temperature fluctuations than other areas of the battery cell or areas representative of an overall temperature of the battery cell.

Figure 17:
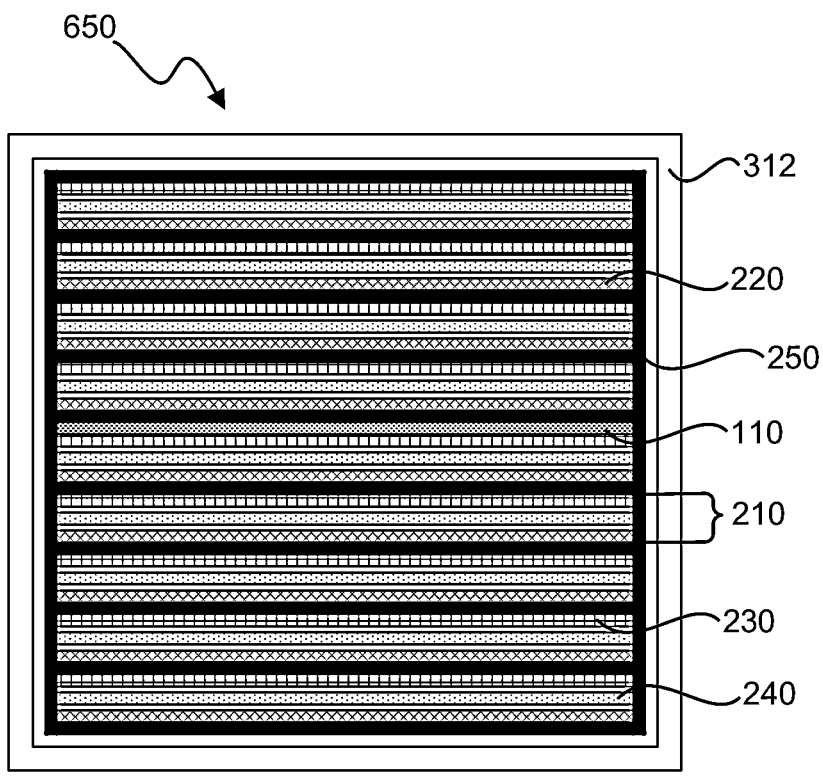
FIG. 17 is an illustrative diagram showing a cross-section of battery cell layers layered with a flexible substrate in a prismatic cell configuration in accordance with an example.

In another example, the battery temperature sensor on the flexible substrate 110 can be integrated in a polymer or prismatic battery cell 650, illustrated in FIG. 17. The battery cell housing 312 can have a hexahedron shape (rectangular cross section), a polyhedron shape, or other shape. The prismatic battery cell can be fabricated by segmenting a battery cell layer into battery cell segments 210. The battery cell segments can include the anode 220, the cathode 230, the porous separator 240, and/or a non-porous separator 250. The battery cell segments can be rectangular in shape. At least one segment can include a flexible substrate. The battery cell segments can be stacked together to form a prismatic battery cell with an integrated battery sensor. Similar connections to the battery cell housing, as described relative to cylindrical configuration can be implemented with prismatic cell. The connections and terminals on a prismatic cell can be the rectangular or square tab type.

Figure 18:
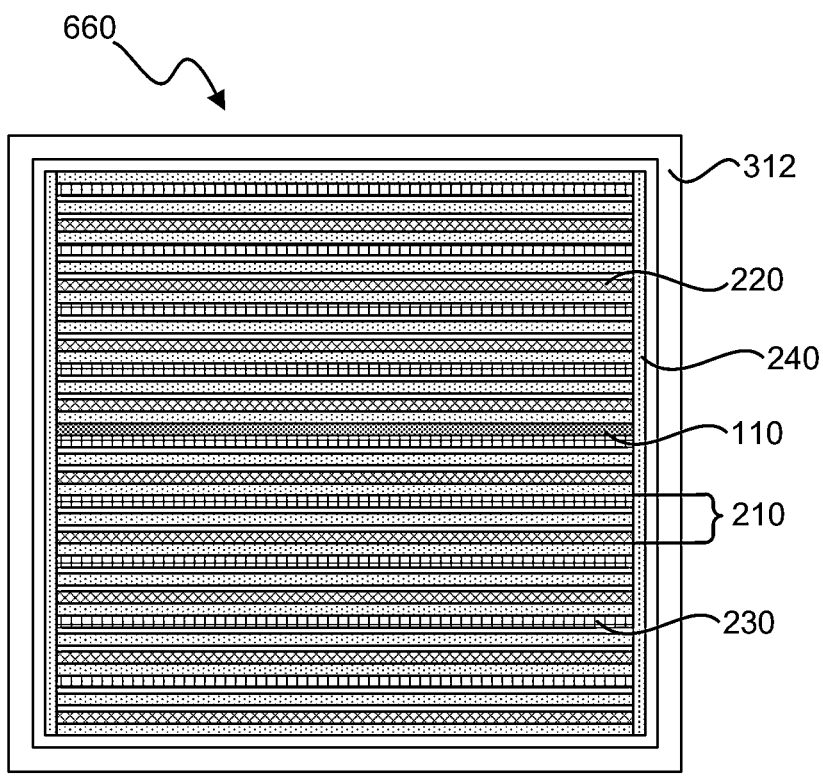
FIG. 18 is an illustrative diagram showing a cross-section of battery cell layers with porous separating layers layered with a flexible substrate in a prismatic cell configuration in accordance with an example.
Figure 19:
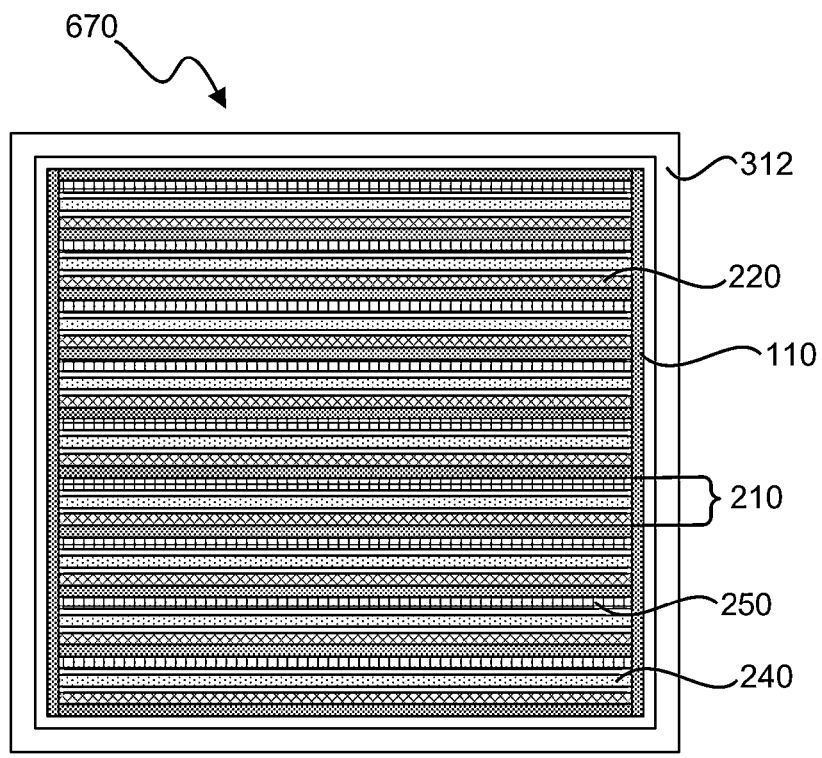
FIG. 19 is an illustrative diagram showing a cross-section of battery cell layers with a flexible substrate forming a nonporous separating layer in a prismatic cell configuration in accordance with an example.
Figure 20:
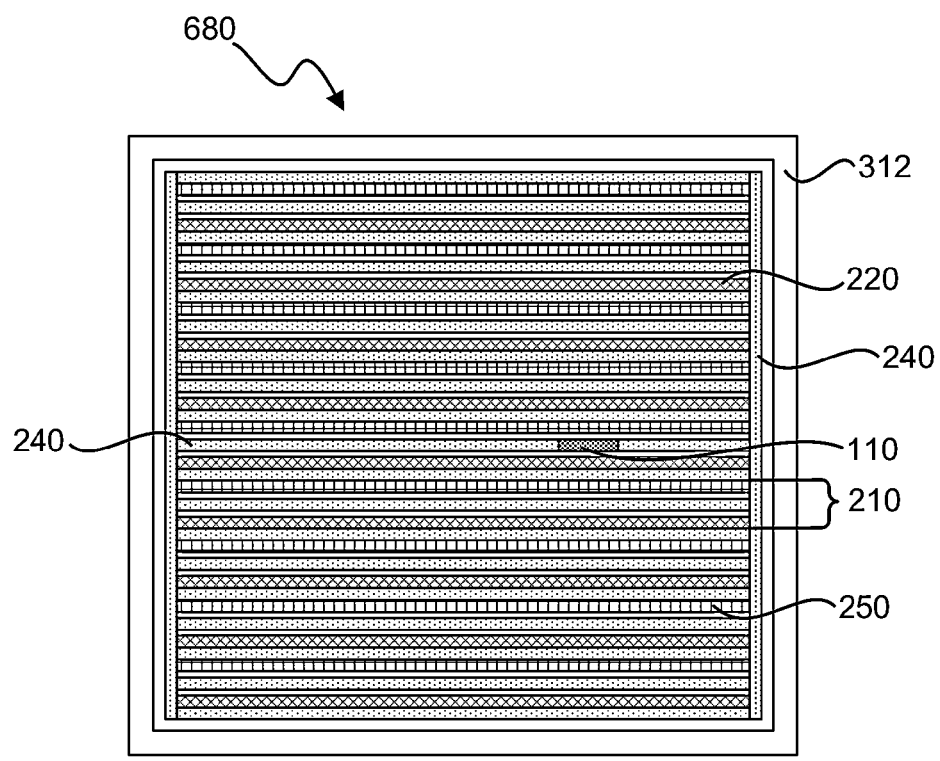
FIG. 20 is an illustrative diagram showing a cross-section of battery cell layers with a flexible substrate on a porous separating layer in a prismatic cell configuration in accordance with an example.
Figure 21:
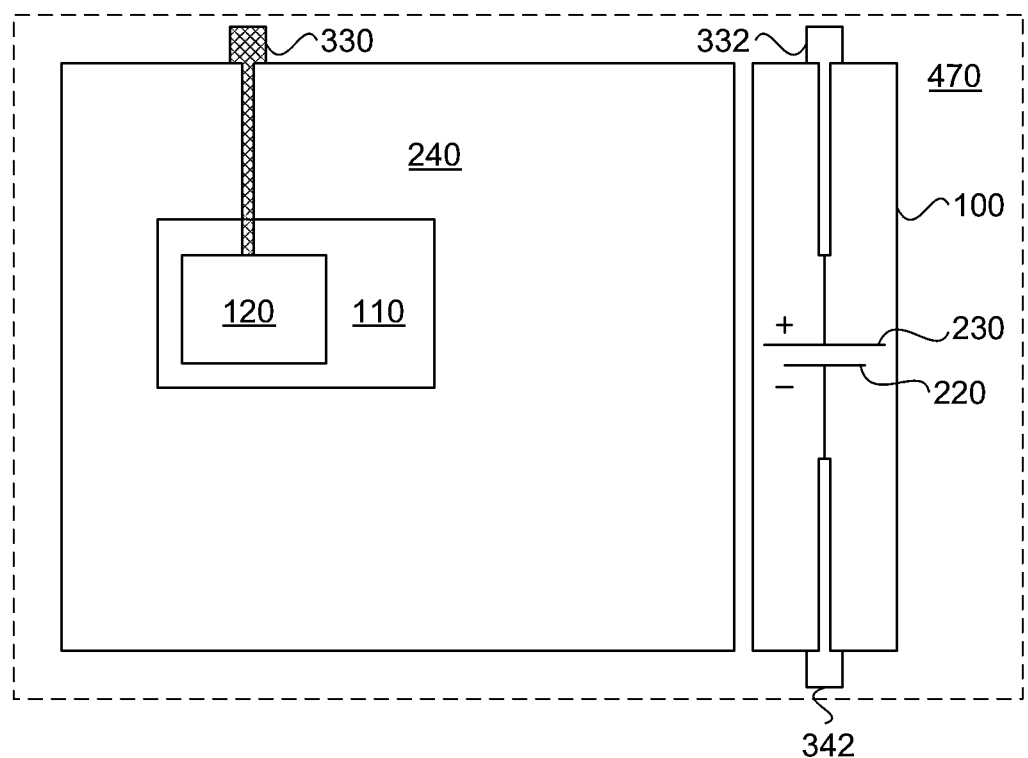
FIG. 21 is an illustrative diagram showing a battery temperature sensor on a flexible substrate on a porous separator in accordance with an example.

FIG. 18 illustrates an example where the porous separator forms electrolyte chambers and provides separation between battery cell segments in a prismatic cell configuration for a battery cell 660. FIG. 19 illustrates an example where the flexible substrate 110 can provide a non-porous separator in a prismatic cell configuration for a battery cell 670. FIG. 20 illustrates an example where a smaller flexible substrate 110 can be laminated to a larger porous separator 240, so the porous separator can provide effective ionic transportation on the area not covered by the flexible substrate. FIG. 21 provides another illustration of the smaller flexible substrate 110 can be laminated to a larger porous separator 240. A battery excursion or larger temperature change can occur between the anode and the cathode in or near the porous separator. For example, lithium plating on the cathode and anode may generate an abnormal quantity of heat. A battery sensor near the porous separator where heat is generated may detect an early change in temperature within the battery cell.

Multiple battery cells with integrated battery cell sensors can be coupled together in a battery unit and the battery unit can be coupled to a control module (or control unit), which can monitor the temperature change in the battery cells. The control module can be coupled to temperature controlling device, such as a heating device, a cooling device, a fan, or similar device that can change the environmental temperature of a battery cell. The temperature of each battery cell can be compared to maintain a relatively constant thermal gradient in the battery unit. When a battery cell temperature is detected that falls outside the tolerances of an acceptable temperature (exceeds or fall below a threshold temperature), the control module can provide a control signal to activate the temperature controlling device, in which the battery cell with abnormal temperature area is either heated or cooled by the temperature controlling device.

An integrated temperature sensor in a battery cell can increase the safety and life of the battery pack by minimizing the temperature gradient over the entire pack. Temperature gradients can cause battery cells to degrade in an uneven manner. Safety issues can arise due to an uneven degradation of battery cells in a battery unit. For example, when one battery cell reaches a specified voltage cut off (voltage at which it is unsafe to operate below), the rest of the battery cells in series may not have reached this cut off In general, since the cutoff voltage may be determined from the entire stack up of cells in the battery unit, the battery cell that reaches the cut off voltage early can continue to be depleted past the cut off voltage. The battery cell that reaches the cut off voltage early can cause safety issues, such as lithium plating on the cathode and/or anode.

The integration of a temperature sensor built on a flexible substrate can be well aligned to the roll-to-roll type manufacturing process currently used for "jelly roll" type cell configurations. The additional process operations of layering a flexible substrate with the other battery cell elements can be easier and less costly to integrate into an existing production facility. Because of low cost fabrication, the number of sensors in the battery unit can be increased, thus improving the safety of the battery unit. If a thermal event, such as thermal runaway is present in the battery unit and a few sensors are present or located some distance from the thermal condition, some time can elapse before the event may be detected by the control unit of a thermal management system. By monitoring a large number of battery cells with battery cell sensors close to areas likely to generate heat can reduce the risk of thermal conditions degrading or damaging the battery unit or device powered by the battery unit.

Figure 22:
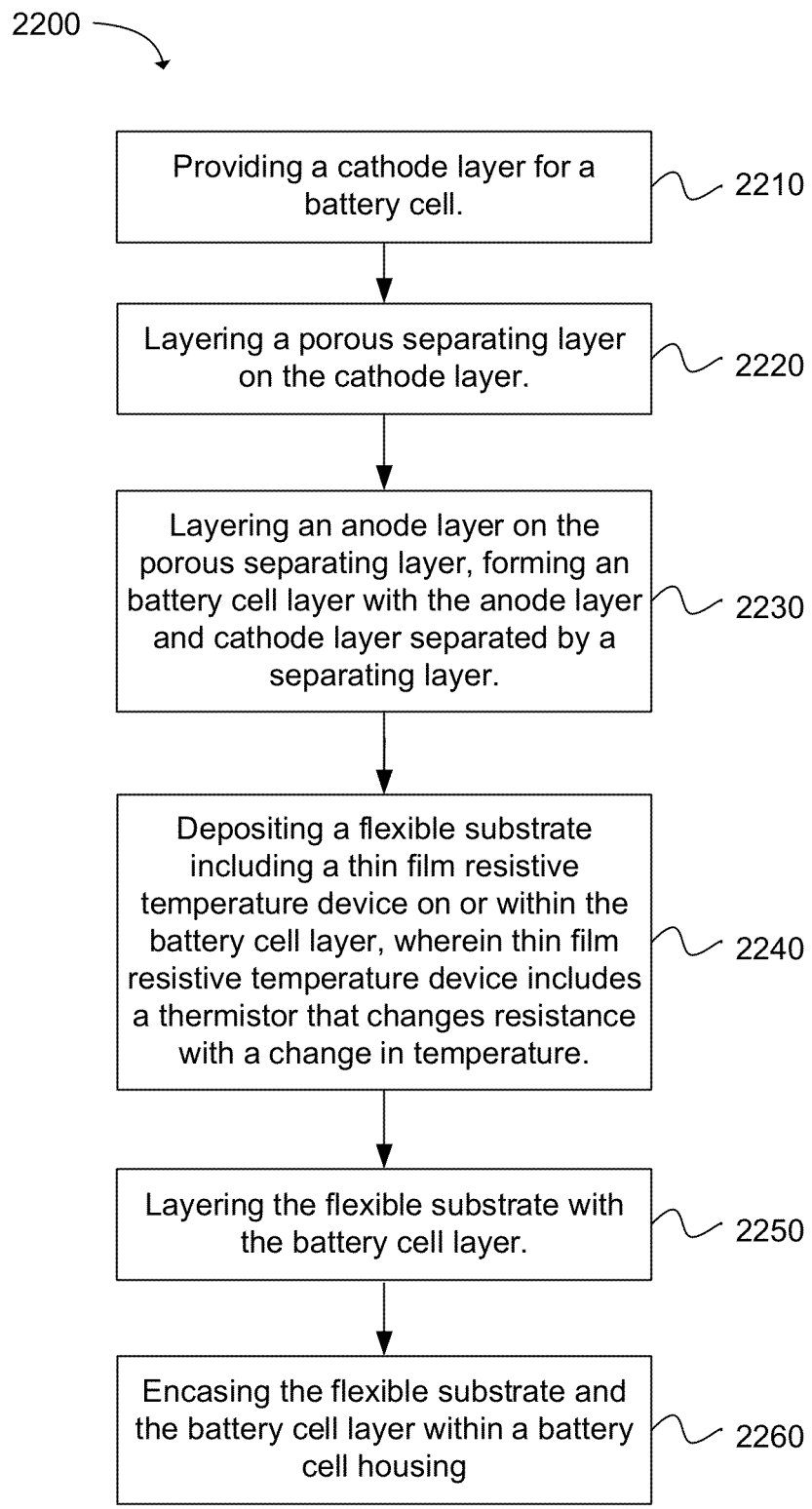
FIG. 22 is a flowchart illustrating a method for fabricating an integrated battery temperature sensor within a battery cell housing in accordance with an example.

Another example provides a method 2200 for fabricating an integrated battery temperature sensor within a battery cell housing, as shown in the flow chart in FIG. 22. The method includes the operation of providing a cathode layer for a battery cell, as in block 2210. The operation of layering a porous separating layer on the cathode layer follows, as in block 2220. The next operation of the method may be layering an anode layer on the porous separating layer, forming a battery cell layer with the anode layer and cathode layer separated by a separating layer, as in block 2230. The operation of depositing a flexible substrate including a thin film resistive temperature device on or within the battery cell layer follows, as in block 2240, wherein thin film resistive temperature device includes a thermistor that changes resistance with a change in temperature. The next operation of the method may be layering the flexible substrate with the battery cell layer, as in block 2250. The method further includes encasing the flexible substrate and the battery cell layer within a battery cell housing, as in block 2260. The layering of the flexible substrate with the battery cell layer can include rolling the battery cell layer and the flexible substrate into a cylindrical cell in a roll-to-roll configuration or segmenting the battery cell layer into battery cell segments, where at least one battery cell segment includes the flexible substrate, and then stacking the battery cell segments into a prismatic cell configuration. A non-porous separating layer can be layered between the cathode layer and anode layer. The non-porous separating layer can restrict an ionic transfer between the cathode layer and anode layer.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts described. Accordingly, it is not intended that the invention be limited, except as by the claims set forth below.

What is claimed is:

1. A battery temperature sensor, comprising:
a substrate layered with a battery cell element, wherein the battery cell element is selected from the group consisting of an anode, a cathode, and a separator between the anode and cathode used in a battery cell;
a thin film resistive temperature device (RTD) on the substrate that changes resistance with a change in temperature, wherein a battery cell housing encloses the thin film RTD; and
a control module to detect a temperature from the thin film RTD and to provide a control signal to activate at least one temperature controlling device for changing the temperature of a plurality of battery cells.

2. The battery temperature sensor of claim 1, wherein the thin film resistive temperature device further comprises:
a thin film thermistor;
a negative sensor terminal to couple a first contact of the thin film thermistor to a negative battery terminal; and
a sensor control connection to couple a second contact of the thin film thermistor to the control module.

3. The battery temperature sensor of claim 2, wherein the control module comprises:
a resistor, wherein a first contact of the resistor is coupled to the sensor control connection and a second contact of the resistor is coupled to a reference voltage;
a control unit coupled to a positive battery terminal, wherein the control unit detects a temperature from the thin film resistive temperature device, and wherein the negative battery terminal is coupled to a direct current (DC) voltage contact with a voltage less than the reference voltage;
an amplifier coupled to the sensor control connection; and
an analog-to-digital converter (ADC) with a ADC input is coupled to an amplifier output and a ADC output is coupled to the control unit.

4. The battery temperature sensor of claim 1, wherein the thin film resistive temperature device further comprises:
a thin film thermistor;
a thin film transistor (TFT) coupled to the thin film thermistor to sense the resistance on the thin film thermistor;
a positive sensor terminal coupled to a source of the TFT;
a negative sensor terminal coupled a first contact of the thin film thermistor, and a second contact of the thin film thermistor is coupled to a drain of the thin film transistor, and the positive sensor terminal and negative sensor terminal to be used by a control module to measure a voltage; and
a sensor control connection coupled to a gate of the TFT to provide a current to the TFT.

5. The battery temperature sensor of claim 1, wherein the thin film resistive temperature device further comprises:
a thin film thermistor;
a capacitor coupled to the thin film thermistor to sense the resistance on the thin film thermistor;
a negative sensor terminal to couple a first contact of the thin film thermistor to a negative battery terminal; and
a sensor control connection to couple a first electrode of the capacitor to a control unit, wherein a second electrode of the capacitor is coupled to a second contact of the thin film thermistor.

6. The battery temperature sensor of claim 1, wherein the thin film resistive temperature device further comprises:
a thin film thermistor; and
a battery inductor coupled to the thin film thermistor to sense the resistance on the thin film thermistor, wherein the battery inductor and thin film thermistor form a loop to provide conductance to a external inductor coupled to a control unit, wherein the external inductor is external to the battery cell housing.

7. The battery temperature sensor of claim 1, wherein the substrate is selected from the group consisting of a stainless steel, a polyimide (PI), a polyethylene naphthalate (PEN), a polyethylene terephthalate (PET), and combination thereof.

8. The battery temperature sensor of claim 1, wherein the thin film resistive temperature device further comprises a thin film thermistor, wherein the thin film thermistor includes a thermo-resistive material selected from the group consisting of platinum (Pt), nickel (Ni), copper (Cu), and combination thereof.

9. The battery temperature sensor of claim 1, wherein the thin film resistive temperature device further comprises a thin-film transistor (TFT), wherein the TFT includes a material selected from the group consisting of a hydrogenated amorphous Si (a-Si:H), a indium-gallium-zinc (In—Ga—Zn) oxide ("IGZO"), a zinc (Zn) oxide, a zinc-tin (Zn—Sn) oxide ("ZTO"), an oxide semiconductor, and combination thereof.

10. A battery with an integrated temperature sensor, comprising:
a plurality of battery cells, each battery cell comprising:
an anode;
a cathode;
a porous separator separating the anode from the cathode;
a thin film temperature sensor layered with the anode, the cathode, and the porous separator; and
a battery cell housing to enclosed the anode, the cathode, the porous separator, and the thin film temperature sensor;
a plurality of integrated battery temperature sensors, wherein the battery cell housing for each battery cell includes an integrated battery temperature sensor; and
a control module coupled to the plurality of integrated battery temperature sensors for monitoring a temperature change in the plurality of battery cells.

11. The battery of claim 10, wherein thin film temperature sensor includes at least one thermistor to change resistance with a change in a battery cell temperature.

12. The battery of claim 11, wherein the thin film temperature sensor includes a plurality of thermistors connected in parallel or series to sense temperatures in various areas of a battery cell, and at least two of the plurality of thermistors include temperature sensor terminals to measure a temperature within a specified area of the battery cell.

13. The battery of claim 10, wherein the thin film temperature sensor is laminated to the anode, the cathode, the porous separator, or a non-porous separator.

14. The battery of claim 10, further comprising temperature sensor terminals coupled to the thin film temperature sensor within the battery cell housing, wherein the temperature sensor terminals provide an electrical contact to the thin film temperature sensor on the battery cell housing.

15. The battery of claim 14, wherein the temperature sensor terminals includes at least a positive sensor terminal, a negative sensor terminal, or a sensor control connection.

16. The battery of claim 10, further comprising a plurality of temperature controlling devices for changing the temperature of the plurality of battery cells, wherein the control module is coupled to at least one temperature controlling device and provides a control signal to activate the temperature controlling device, wherein a temperature controlling device is selected from the group consisting of a heating device, a cooling device, a fan, and combination thereof.

17. A method comprising:
   fabricating a plurality integrated battery temperature sensors in a plurality battery cells, each integrated battery temperature sensor being fabricated within a battery cell housing and the plurality integrated battery temperature sensors fabricated and arranged to communicate with a control module for monitoring a temperature change in the plurality of battery cells, the fabricating of each integrated battery temperature sensor comprising:
   providing a cathode layer for a battery cell;
   layering a porous separating layer on the cathode layer;
   layering an anode layer on the porous separating layer, forming a battery cell layer with the anode layer and cathode layer separated by the porous separating layer;
   depositing a flexible substrate including a thin film resistive temperature device with the battery cell layer, wherein thin film resistive temperature device includes a thermistor that changes resistance with a change in temperature; and
   layering the flexible substrate with the battery cell layer;
   encasing the flexible substrate and the battery cell layer within a battery cell housing.

18. The method of claim 17, wherein layering the flexible substrate with the battery cell layer further comprises rolling the battery cell layer and the flexible substrate into a cylindrical cell in a roll-to-roll configuration.

19. The method of claim 17, wherein layering the flexible substrate with the battery cell layer further comprises:
   segmenting the battery cell layer into battery cell segments, wherein at least one battery cell segment includes the flexible substrate; and
   stacking the battery cell segments into a prismatic cell configuration.

* * * * *

UNITED STATES PATENT AND TRADEMARK OFFICE
CERTIFICATE OF CORRECTION

PATENT NO. : 8,828,570 B2
APPLICATION NO. : 13/172158
DATED : September 9, 2014
INVENTOR(S) : Neel Banerjee et al.

It is certified that error appears in the above-identified patent and that said Letters Patent is hereby corrected as shown below:

In the Claims

In column 11, line 55, in Claim 4, delete "coupled" and insert -- coupled to --, therefor.

Signed and Sealed this
Sixth Day of January, 2015

Michelle K. Lee
*Deputy Director of the United States Patent and Trademark Office*